United States Patent [19]

Scripps

[11] Patent Number: 5,673,360
[45] Date of Patent: Sep. 30, 1997

[54] TRAVEL HUMIDIFIER

[76] Inventor: J. Sebastian Scripps, P.O. Box 204, Thompson, Conn. 06277

[21] Appl. No.: 526,678

[22] Filed: Sep. 11, 1995

[51] Int. Cl.$^6$ .............................. F24F 6/00; A61H 33/12; B65D 6/12
[52] U.S. Cl. ........................ 392/405; 392/401; 220/8
[58] Field of Search ........................ 392/402, 403, 392/404, 405, 406, 337; 361/42, 44, 45; 220/8

[56] References Cited

U.S. PATENT DOCUMENTS

| | | |
|---|---|---|
| 1,909,973 | 5/1933 | Lewis et al. . |
| 2,467,630 | 4/1949 | Pargman . |
| 2,577,958 | 12/1951 | Fisher . |
| 2,875,314 | 2/1959 | Schreyer ........................ 392/405 |
| 3,584,192 | 6/1971 | Maag . |
| 3,610,880 | 10/1971 | Kreiberg . |
| 4,353,103 | 10/1982 | Whitlow ........................ 361/45 |
| 4,734,561 | 3/1988 | Miller ........................ 392/401 |
| 4,965,693 | 10/1990 | Aoki . |
| 5,014,338 | 5/1991 | Glucksman . |
| 5,198,955 | 3/1993 | Willner . |
| 5,343,551 | 8/1994 | Glucksman . |
| 5,422,976 | 6/1995 | Knepler ........................ 392/451 |
| 5,437,002 | 7/1995 | Bennett ........................ 392/441 |

Primary Examiner—Geoffrey S. Evans
Assistant Examiner—Sam Paik
Attorney, Agent, or Firm—Richard H. Kosakowski, Esq.; Holland & Bonzagni, P.C.

[57] ABSTRACT

A portable and compact humidifier for use in a hotel room includes a vaporizing chamber having a heating element that vaporizes water contained in a hotel sink or ice bucket. Various safety devices are provided, all of which connect with a ground fault interrupt circuit ("GFCI") located at the electrical plug end of the humidifier. Upon the occurrence of a fault condition, the GFCI disconnects electricity from the vaporizing element. The safety devices include both high and low water level sensors, and a heating element overheat sensor. The humidifier enclosure may either comprise a single component that allows the entire humidifier to float in the reservoir, or the enclosure may comprise a plurality of enclosure sections that telescope relative to each other. The uppermost section is fixed in height with respect to the reservoir, while the lowermost section floats in the reservoir. As the level of water in the reservoir decreases, the telescoping enclosure increases in length.

18 Claims, 4 Drawing Sheets

TRAVEL HUMIDIFIER

BACKGROUND OF THE INVENTION

This invention relates to humidifiers, and more particularly to a portable humidifier adapted for easy storage during travel and usage in a hotel room.

In a typical hotel or motel room, the windows usually cannot be opened by the guest. This may be for security reasons and/or to make the hotel's environmental control system run more efficiently. However, this type of "closed" or "sterile" environment oftentimes leaves the room with relatively dry air, which may contribute to health problems.

Some hotels have recognized this problem and provide the guest with a "standard" humidifier upon request. Such a humidifier may comprise a water heating or vaporizing element integrated with a water reservoir in a single device. This type of humidifier is similar to a commercially-available device intended for use in the home. However, since relatively few hotels provide their guests with such a device, the traveler cannot rely on the fact that the destination hotel will make such a humidifier available.

Another problem is that the typical home humidifier is of a relatively large size that does not allow it to be conveniently packed into a suitcase. This is due primarily to the size of the water reservoir, usually the largest part of a home humidifier. Notwithstanding this packing problem, the size and weight of the typical home humidifier generally render it cumbersome to take along on trips.

Accordingly, it is a primary object of the present invention to provide a travel humidifier that adds moisture to the relatively dry air of a sealed and sterile hotel room.

It is a general object of the present invention to provide a traveler with a means of better controlling the quality of air in a hotel room.

It is another object of the present invention to provide a travel humidifier comprised of a water vaporizing element that is readily placed into water held in, e.g., a sink or ice bucket in a hotel room.

It is another object of the present invention to provide a travel humidifier that eliminates the need for an integral water reservoir.

It is yet another object of the present invention to provide a relatively small and compact portable humidifier.

It is still another object of the present invention to provide a humidifier that easily packs in a suitcase or overnight bag for travel.

Still another object of the present invention is to provide a travel humidifier having various safety features that protect the vaporizing element from damage and the user from possible electric shock.

It is still another object of the present invention to provide a travel humidifier having a ground fault circuit interrupter ("GFCI") at the electrical plug end, the GFCI preventing electrical power from being applied to the vaporizing element upon occurrence of one of a number of different faults.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented a compact and portable humidifier that readily lends itself to usage in a hotel or motel room.

In a preferred embodiment, the humidifier includes a vaporizing chamber containing an electric-powered, ceramic, water heating or vaporizing element. The vaporizing chamber has one or more small holes in the bottom to allow water to enter the chamber. The water is contained in a reservoir that is separate from the humidifier and, thus, forms no part of the present invention. The vaporizing chamber also has a vent opening on top to allow the water vapor to escape into the environment. The vaporizing chamber includes flotation chambers to give the humidifier buoyancy and maintain a constant water level within the vaporizing chamber. The humidifier also includes various safety devices, all of which are connectable with a GFCI located at the electrical plug end of the humidifier. In the event of an occurrence of one or more fault conditions, the GFCI prevents electricity from being supplied to the vaporizing element. For example, the GFCI prevents electric shock to the user of the humidifier if any part of the humidifier becomes electrically grounded. The humidifier also includes both low and high water level sensors that trigger the GFCI to prevent electricity from being supplied to the vaporizing element upon the occurrence of low and high water level conditions, respectively, within the vaporizing chamber. This prevents damage to the vaporizing element. Also, an overheat sensor is provided that senses an overheat condition of the vaporizing element and triggers the GFCI accordingly.

In use, the humidifier is placed in a sink or ice bucket, or other water reservoir, located in a hotel room. In accordance with one aspect of the humidifier of the present invention, the humidifier floats freely (i.e., unattached) in the water reservoir. Once the humidifier has vaporized the water in the reservoir (such that the humidifier descends downward toward the bottom of the reservoir), the low water level sensor triggers the GFCI to shut off the humidifier. In accordance with another aspect of the humidifier of the present invention, the enclosure of the vaporizing chamber has a plurality of telescoping sections. The top surface of the enclosure has a means for contacting the sink or ice bucket, thereby keeping the enclosure top surface at a constant height with respect to the sink or ice bucket. In this aspect, the humidifier no longer free floats in the water reservoir. Instead, as the water level in the reservoir decreases (due to the vaporizing element vaporizing the water in the reservoir), the humidifier enclosure progressively increases in length, due to the telescoping nature of the enclosure. Once the water in the reservoir has been depleted, the low water level sensor triggers the GFCI to shut off the vaporizing element.

DETAILED DESCRIPTION OF THE PREFERRED EMBODIMENTS

Referring to the drawings in detail, a travel humidifier adapted to be easily packed in a suitcase or overnight bag and subsequently used in a hotel room is illustrated therein and generally indicated by the reference numeral 100. The humidifier 100 includes an outer enclosure 104, with two different embodiments of the enclosure 104 being described and illustrated herein. A first embodiment of the enclosure 104 includes a single enclosure section 108 that is designed to freely float within a water reservoir 112, such as a sink or ice bucket in a hotel room. The alternative embodiment of the enclosure 104 comprises a plurality of telescoping enclosure sections 116–124, with the uppermost enclosure section 116 fixed with respect to a housing 128 of the sink or ice bucket. The lowermost enclosure section 124 is designed to freely float within the water reservoir 112. As the level of the water 132 in the reservoir 112 decreases, the plurality of enclosure sections 116–124 extend with respect to one another as the lowermost enclosure section 124 tends to maintain a constant position with respect to the water level of the reservoir 112.

A water heating or vaporizing element 136 is disposed within a vaporizing chamber 140 of an enclosure section 108, 124. Water 132 from the reservoir 112 enters the vaporizing chamber 140, and water vapor exits the chamber 140 through an opening 144 in the top thereof. Flotation chambers 148 are provided in the enclosure section 108, 124 to allow for buoyancy of the humidifier 100. The heating element 136 is electrically powered through electricity supplied by normal house current. A GFCI unit 152 is located at the electrical plug end and disconnects power to the heating element 136 upon the occurrence of one of a number of different fault conditions. For example, the vaporizing chamber 140 includes a low water level sensor 156, a high water level sensor 160, and an overheat sensor 164. These sensors 156–164 detect various fault conditions that could harm the vaporizing element 136. Upon the occurrence of one of these conditions, the GFCI unit 152 disconnects electrical power at the plug end from being applied to the heating element 136.

Figure 1:
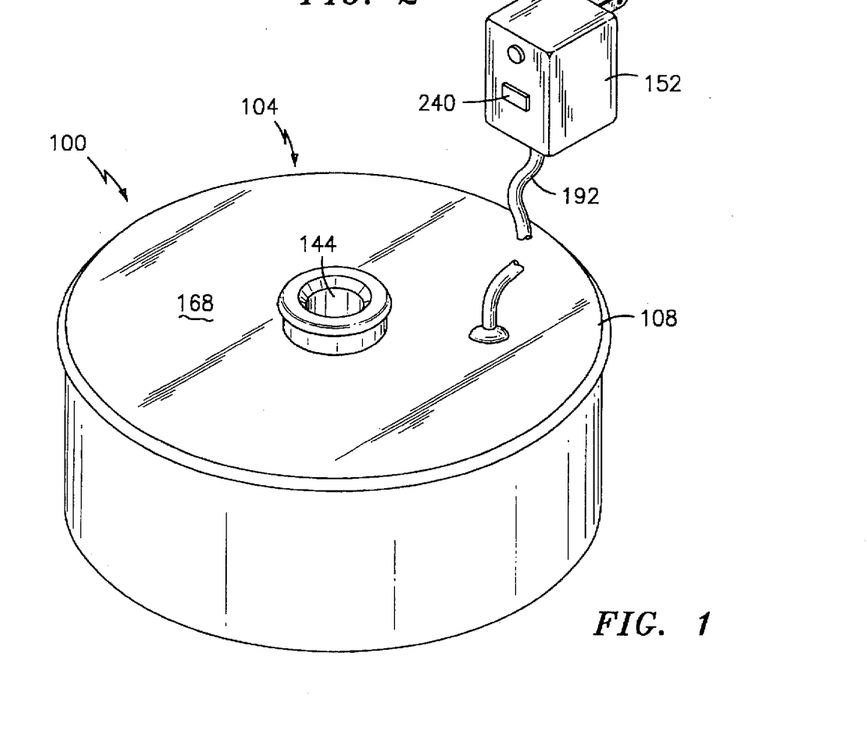
FIG. 1 is a perspective view of a travel humidifier in accordance with one aspect of the present invention.
Figure 2:
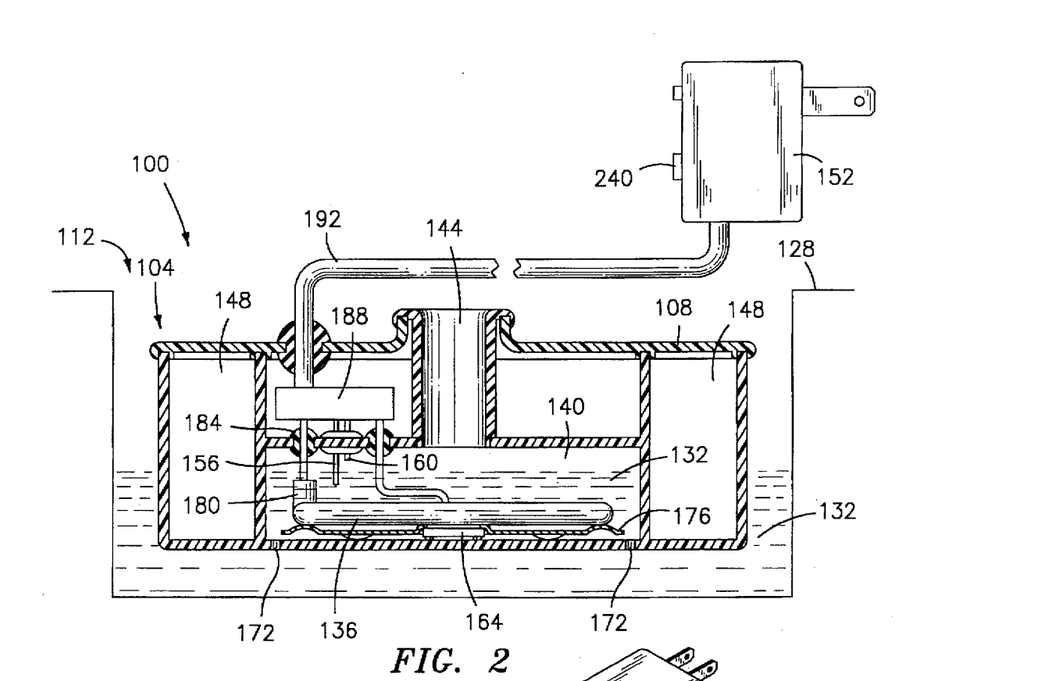
FIG. 2 is a side elevational view illustrating in cross section a main housing portion of the humidifier of FIG. 1.

Referring to FIGS. 1 and 2, there illustrated is the travel humidifier 100 of the present invention. In accordance with a first aspect of the present invention, the humidifier 100 has a circular-shaped, single-stage enclosure or housing 108, fabricated from high-heat plastic. The enclosure 108 has a top surface 168 with a centrally located aperture 144 through which vapor is allowed to escape into the surrounding environment of the hotel room. The humidifier 100 includes a GFCI unit 152 that plugs into a normal AC electrical outlet located in the hotel room. The circuitry of the GFCI unit is described in greater detail hereinafter with respect to FIG. 6.

The single-stage enclosure 108 is designed to freely float within a water reservoir 112 provided in the hotel room, such as a sink or an ice bucket. Water 132 in the reservoir 112 enters the vaporizing chamber 140 through one or more holes 172 in the bottom of the enclosure 108. Air-filled flotation chambers 148 located around the periphery of the enclosure 108 give the humidifier 100 buoyancy and allow for a predetermined and constant water level within the vaporizing chamber 140 during normal humidifier operation.

A ceramic, electrically-powered water heating and vaporizing element 136 is disposed within the vaporizing chamber 140. The heating element 136 heats the water 132 within the chamber 140 to create the vapor that emanates from the aperture 144 and into the surrounding environment. The heating element 136 is disposed on top of an aluminum insulator 176, that itself is disposed on an upper surface on the bottom of the enclosure 108 within the vaporizing chamber 140. Electric power is fed to the heating element through insulated conductors 180 that are fed through a hole in the upper surface of the vaporizing chamber 140. The hole is sealed with a rubber grommet 184 to keep water from escaping out of the vaporizing chamber 140. The electrical conductor 180 connected with the heating element 136 also connects with a waterproof, resin-enclosed casing 188. This casing 188 also contains most of the electrical circuitry of FIG. 6 (described in detail hereinafter), with the exception of the GFCI unit 152. The casing 188 keeps these electrical components from exposure to water 132 to prevent electrical shock of the user. The casing 188 connects by an electrical cord 192 to the GFCI unit 152. Also, as described in detail hereinafter, a portion of the electrical conductor 180 feeding the heating element 136 has a portion of its insulation removed to expose the conductor to water.

Disposed between the upper surface of the bottom of the enclosure 108 and the bottom of the aluminum insulator 176 is an overheat sensor 164. This sensor 164 electrically connects by a conductor to the circuitry within the resin casing 188. The conductor is fed through a similar hole and grommet arrangement. The function of this overheat sensor 164 will be described in detail hereinafter.

Also provided are a low water level sensor 156 and a high water level sensor 160. These sensors 156, 160 are electrical conductors that are exposed to the water 132 in the vaporizing chamber 140. As seen in detail in FIG. 2, the low water sensor 156 is at a different height within the vaporizing chamber 140 as compared to the high water level sensor 160. Both of these sensors 156, 160 electrically connect to the circuitry within the resin casing 188.

Figure 3:
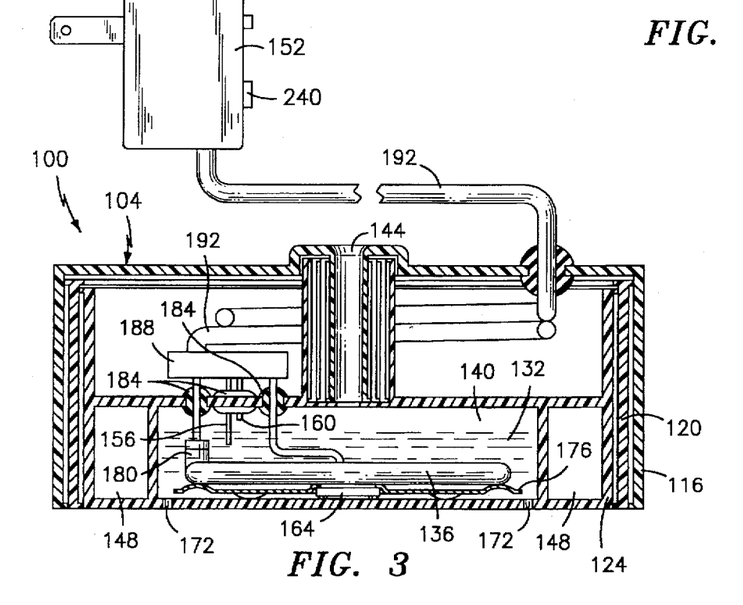
FIG. 3 is a side elevational view illustrating in cross section an alternative embodiment of the main housing portion of a travel humidifier in a retracted position.
Figure 4:
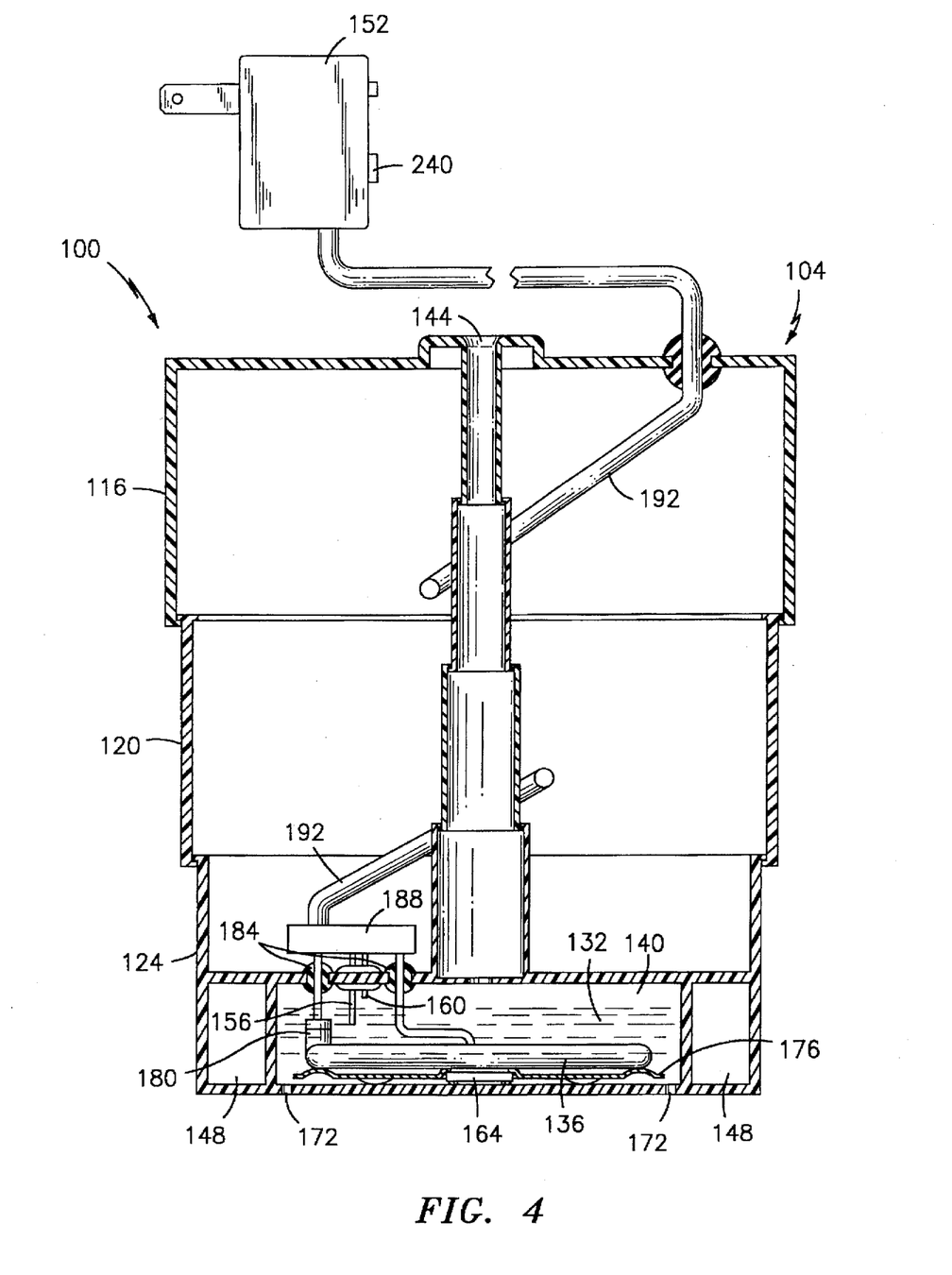
FIG. 4 is a side elevational view illustrating in cross section the main housing portion of the humidifier of FIG. 3 in an extended position.
Figure 5:
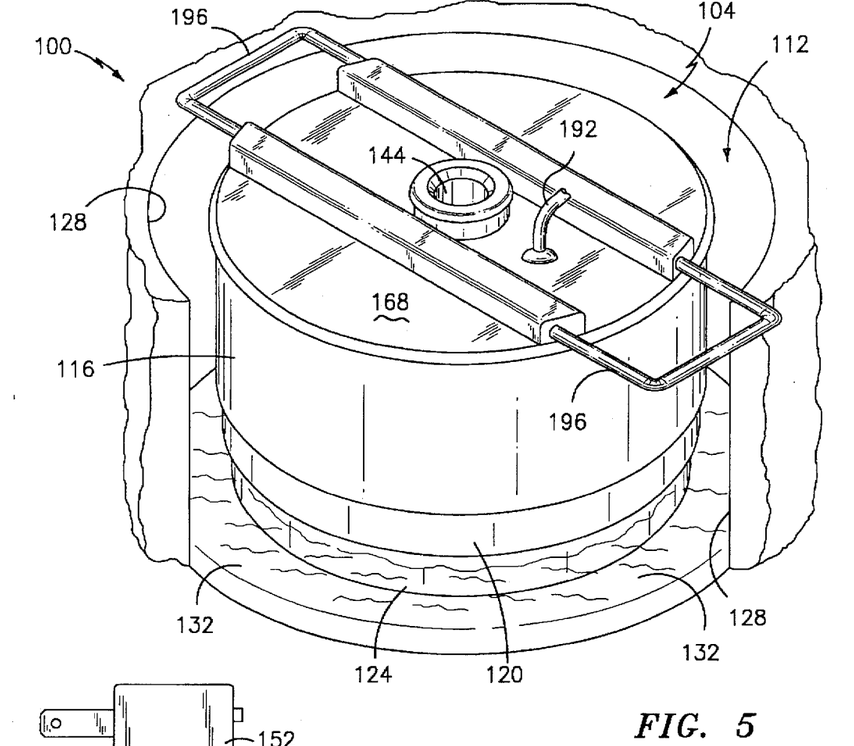
FIG. 5 is a perspective view of the humidifier of FIGS. 3 and 4.

Referring to FIGS. 3–5, there illustrated is the travel humidifier 100 of the present invention utilizing an alternative embodiment for the outer enclosure 104. In this embodiment, the enclosure 104 comprises a plurality of sections 116–124 that are "telescoping" in nature, such that the sections can slide relative to each other. In the embodiment illustrated, three separate enclosure sections 116–124 are provided. FIG. 3 illustrates the three enclosure sections 116–124 in a retracted position. On the other hand, FIG. 4 illustrates the enclosure sections in an extended position.

In contrast to the single enclosure section 108 embodiment of FIGS. 1 and 2, the alternative embodiment of FIGS. 3–5 is designed such that a top surface 168 of the upper enclosure section 116 has a pair of slidable arms 196 that contact a surface of the housing 128 of the water reservoir 112. That is, the slidable arms 196 rest on top of the sink 128. In this way, the upper enclosure section 116 is "fixed" in height with respect to the water reservoir 112. When the water reservoir 112 is full, the plurality of enclosure sections 116–124 will be in their retracted position of FIG. 3. This is because the water level in the sink or ice bucket causes the lowermost enclosure section 124 to float within the water 132 at a predetermined and constant level. More specifically, the floatation chambers 148 tend to urge the plurality of enclosure sections 116–124 into their retracted position. On the other hand, as the water level in the sink or ice bucket decreases (as the water is continually vaporized by the heating element 136), the enclosure sections 116–124 will gradually become extended. Again, this is because the lowermost enclosure section 124 tends to assume a floatable position within the water reservoir 112.

Figure 6:
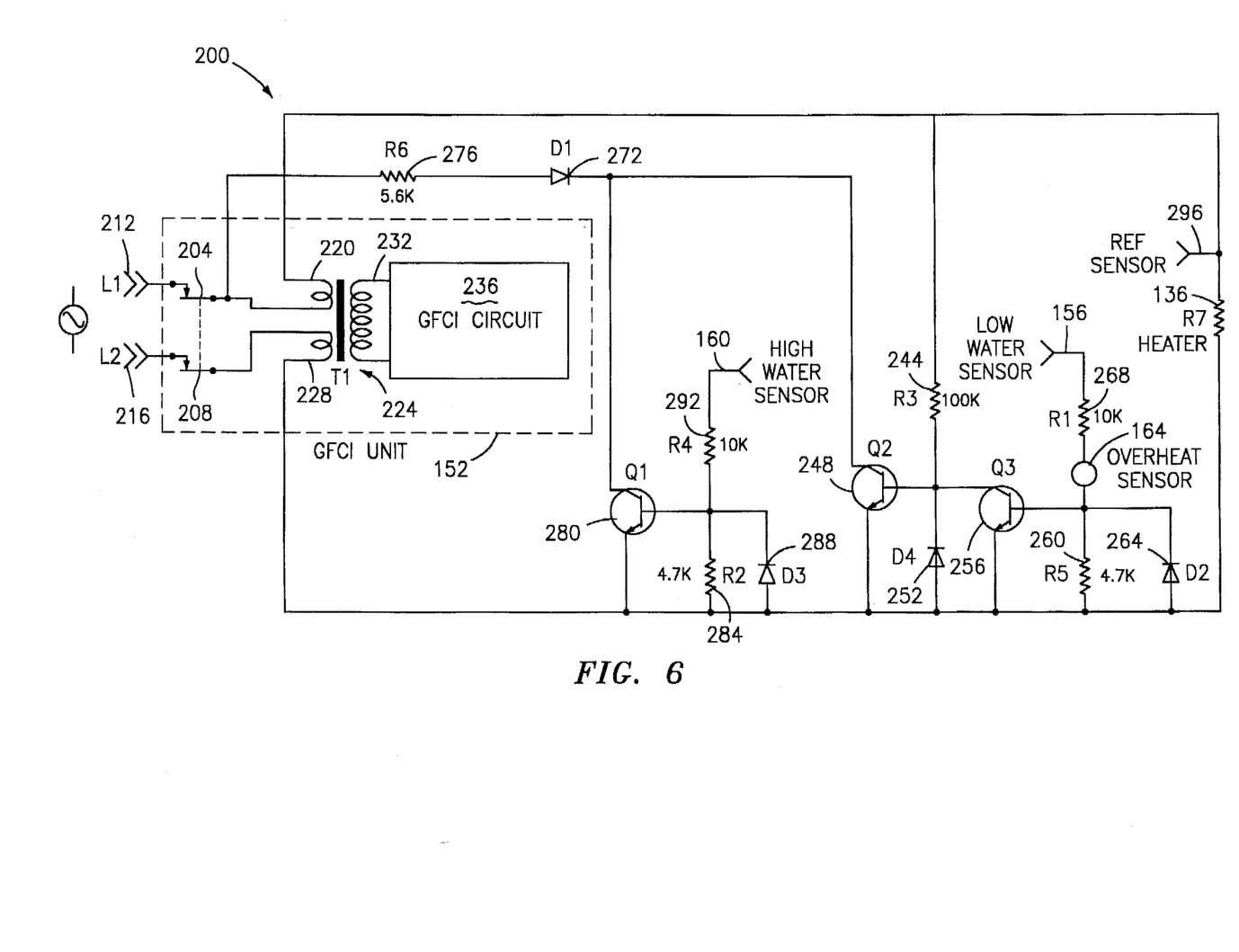
FIG. 6 is a schematic illustration of an electrical circuit incorporated within the humidifier of FIGS. 1–5.

Referring to FIG. 6, there illustrated is a schematic diagram of the circuitry 200 of both embodiments of the travel humidifier 100 of FIGS. 1–5. The GFCI unit 152 contains a pair of relay contact switches 204, 208 that are operable in tandem. These switches 204, 208 are connected to corresponding conductors, $L_1$ 212, $L_2$ 216, of standard AC electrical power. The other side of the upper switch 204 connects to an upper coil 220 of the primary side of a transformer, $T_1$ 224. This transformer 224 also forms part of the GFCI unit 152. In a similar manner, the other side of the lower switch 208 connects to one side of the lower coil 228 of the primary side of the transformer, $T_1$ 224. The secondary coil 232 of the transformer, $T_1$ 224, connects to the current-sensing GFCI circuit 236 that also forms a part of the GFCI unit 152. This unit 152 may comprise the Model 30120, provided by Technology Research Corp., of Clearwater, Fla. This circuit 236 controls the opening and closing of the two switches 204, 208, depending upon the balance of current in the primary coils 220, 228 of the transformer, $T_1$ 224. This GFCI unit 152 is illustrated in perspective in FIGS. 1–4. The unit 152 also includes a push button 240 which can manually activate the two switches 204, 208.

The other side of the upper coil 220 is connected to one side of a resistor, $R_7$ 136, which represents the ceramic heating element. The other side of $R_7$ 136 connects to the lower primary transformer coil 228. Thus, the heater 136 is powered by AC electrical power. The upper coil 220 also connects to a resistor, $R_3$ 244. The other side of this resistor 244 is connected to the base of a transistor, $Q_2$ 248, which may comprise the Model 2N5551, commercially-available. The base of the transistor 248 connects to the cathode of a diode, $D_4$ 252, which may comprise the Model 1N4148, commercially-available. The base of transistor $Q_2$ 248 also connects to the collector of another transistor, $Q_3$ 256, which may comprise the Model 2N3904, commercially-available. The emitter terminals of both transistors $Q_2$ 248 and $Q_3$ 256 are connected to the lower primary coil 228 of the transformer $T_1$ 224. The base of transistor $Q_3$ 256 connects to one side of a resistor, $R_5$ 260, the other side of which connects to the lower primary coil 228 of the transformer 224. The base of the transistor $Q_3$ 256 also connects to the cathode of a diode, $D_2$ 264, which may comprise Model 1N4148, commercially-available. The anode of this diode 264 connects to the lower primary coil 228 of the transformer 224.

The base of transistor $Q_3$ 256 also connects to the overheat sensor 164, the other side of which is connected to a resistor, $R_1$ 268. The other side of this resistor $R_1$ 268 is an electrical conductor that comprises the low water sensor 156. The overheat sensor 164 may comprise a normally-closed metallic element that becomes electrically open upon the occurrence of an overheat condition with respect to the ceramic heating element 136.

The collector of transistor $Q_2$ 248 connects to the cathode of a diode, $D_1$ 272, which may comprise Model 1N4003, commercially-available. The anode of this diode 272 connects to one side of a resistor, $R_6$ 276, the other side of which connects to the upper switch 204. Resistor $R_6$ 276 limits the current drawn by the circuitry of transistor $Q_1$–$Q_3$ to a level sufficient to trip the GFCI circuit 236. $D_1$ 272 rectifies the voltage applied to the circuitry of transistors $Q_1$–$Q_3$. AC voltage is applied to this circuitry to prevent any plating of the sensor conductors 156–164. The cathode of diode $D_1$ 272 also connects to the collector terminal of transistor $Q_1$ 280, which may comprise Model 2N5551, commercially-available. The emitter of this transistor 280 connects to the lower primary coil 228 of the transformer. The base of transistor $Q_1$ 280 connects to one side of a resistor, $R_2$ 284, and a diode, $D_3$ 288, the other side of both of these elements being connected to the lower primary coil 228 of the transformer. Resistor $R_2$ 284 reduces the sensitivity of that circuit, while diode $D_3$ 288 prevents breakdown of the emitter-base junction of transistor $Q_1$ 280, as well as insuring that symmetrical AC electrical current is applied to the sensor conductors 156–164. Diode $D_3$ 288 may comprise Model 1N4148, commercially-available. The base of transistor $Q_1$ 280 also connects to a side of a resistor $R_4$ 292, which prevents damage to transistor $Q_1$ if the water is highly conductive. The other side of this resistor 292 is an electrical conductor that comprises the high water sensor 160. The numerical values, in ohms, for all of the resistors are given in FIG. 6.

In normal usage of the travel humidifier 100 of the present invention, the water reservoir 112, (e.g., the sink or ice bucket) in the hotel room is filled with water 132. The humidifier 100 is then placed into the water reservoir 112, and water enters the vaporizing chamber 140. The water 132 assumes a level within the vaporizing chamber 140 such that water contacts the low water sensor 156, but not the high water sensor 160. The flotation chambers 148 provide water 132 at a proper level within the vaporizing chamber 140. The water in the vaporizing chamber also contacts an exposed portion of the electrical conductor 180 leading to the heating element 136. This exposed conductor 180 is referred to as the reference sensor 296 in FIG. 6, and is located at a level in the vaporizing chamber 140 such that the conductor 180 always contacts water. The user then resets the switches 204, 208 by manual activation thereof. The humidifier 100 is then ready for operation.

During normal usage, AC electrical power is fed through the two primary transformer windings 220, 228 to the heating element 136. Electrical power is also fed through the resistor, $R_3$ 244, to the transistor $Q_2$ 248. However, the water 132 in the vaporizing chamber 140 acts like an electrical conductor in connecting together the low water sensor 156 with the reference sensor 296. Thus, electrical current is fed through the resistor, $R_1$ 268, and the overheat sensor 164 to turn on transistor $Q_3$ 256. When transistor $Q_1$ 256 is on, it turns off transistor $Q_2$ 248. Also, transistor $Q_1$ 280 is turned off because no current flows to the high water sensor 160, due to the lack of any electrical connection thereto. In this situation, the current in the two primary transformer coils 220, 228 is balanced, and the secondary coil 232 in the GFCI circuit 236 detects this balance in electrical current and keeps the two switches 204, 208 closed. Thus, the heater 136 is allowed to heat and vaporize the water 132 within the vaporizing chamber 140.

On the other hand, if too much water is applied within the vaporizing chamber, an electrical path between the reference sensor 296 and the high water sensor 160 occurs such that the transistor, $Q_1$ 280, is now turned on. This causes an imbalance in the current flow through the upper primary transformer coil 220 as compared to the current in the lower primary transformer coil 228. This current imbalance is sensed by the secondary transformer coil 232 and the GFCI circuit 236, which will open the two switches 204, 208 and therefore, disconnect electrical power to the heater 136.

Likewise, if the water 132 within the vaporizing chamber 140 becomes lower than the low water sensor 156, the electrical connection between the low water sensor 156 and the reference sensor 296 will be broken. This will turn off transistor $Q_3$ 256, and will allow current to flow through resistor $R_3$ 244 to ultimately turn on transistor $Q_2$ 248. When transistor $Q_2$ is turned on, it draws current from the upper primary coil 220 of the transformer 224, which again causes an imbalance in the current in the two primary transformer coils 220, 228 and ultimately causes the two switches 204, 208 to open.

In a similar manner, if the overheat sensor 164 detects a temperature overheat condition in association with the heating element 136 (which is disposed adjacent to the overheat sensor), then transistor $Q_3$ 256 will be turned off, which allows transistor $Q_2$ 248 to turn on. Again, this causes an imbalance in the current flow through the two primary transformer coils 220, 228. This will ultimately lead to an opening of the two switches 204, 208.

Thus, it can be seen from the foregoing that the low water sensor 156 detects when the water 132 in the vaporizing chamber 140 (and thus, the water in the reservoir 112) has nearly run out. This allows the travel humidifier 100 of the present invention to be used in an unattended manner, since the GFCI unit 152 will automatically shut off power to the heater 136 when the water has been used up. However, the low water sensor 156, together with the high water sensor 160, can also be used to detect fault conditions, such as too much water within the vaporizing chamber 140, or the travel humidifier has become "tipped" with respect to water in the reservoir.

The GFCI unit 152 also detects when a potentially hazardous short circuit of electrical power to any part of the humidifier 100 occurs. As such, the GFCI circuit 236 opens the switches 204, 208, and prevents power from being applied to the humidifier 100.

It should be understood that the circuitry 200 of FIG. 6 is purely exemplary. Other circuitry could be used, in light of the teachings herein, to provide for the safety features of the humidifier 100 of the present invention. For example, the reference sensor 296, comprising an exposed electrical conductor, could be eliminated, and providing for proper for providing for proper sensing of low and high water conditions. Further, silicon controlled rectifiers could be substituted for transistors $Q_1$ 280 and $Q_2$ 248. In this case, diode $D_1$ 272 could be eliminated. Also, the overheat sensor 164 could be eliminated and a self regulating (temperature) heating element could be used.

Further, the telescoping enclosure embodiment of the travel humidifier 100 has been described as including a pair of slidable arms 196 for contacting the housing 128 of the water reservoir 112. However, it should be understood that these slidable arms are purely exemplary; other means for contacting the housing of the reservoir may be utilized, if desired, in light of the teachings herein. The arms 196 are made slidable in that if the arms are pushed in on both sides, they allow the unit 100 of FIGS. 3–5 to freely float in the water reservoir, similar to the embodiment of FIGS. 1 and 2. On the other hand, as described hereinbefore, with the arms 196 in their extended position and contacting top of the sink 128, they allow the upper enclosure section 116 to function as a reference point with respect to the height of the travel humidifier 100 in the water.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A portable humidifier for vaporizing water held in a water reservoir apart from the humidifier, the humidifier comprising:

a. a vaporizing chamber having at least one inlet for passing water therethrough and into the vaporizing chamber, and having at least one outlet for passing water vapor therethrough and out of the vaporizing chamber and into a surrounding environment, the vaporizing chamber having floating means associated therewith for floating the vaporizing chamber in the water reservoir;

b. vaporizing means, disposed in the vaporizing chamber, for vaporizing water within the vaporizing chamber to create the water vapor that passes through the outlet into the surrounding environment;

c. high water means for sensing when a level of the water in the vaporizing chamber has exceeded a first predetermined height, and for preventing the vaporizing means from vaporizing water within the vaporizing chamber when the level of water in the vaporizing chamber has exceeded the first predetermined height; and d. a telescoping outer enclosure comprising a plurality of enclosure sections connected together, a lowermost enclosure section enclosing the vaporizing chamber and the vaporizing means, an uppermost enclosure section connected with a housing of the water reservoir, as the level of water in the water reservoir decreases over time as the water is vaporized, the enclosure sections slide with respect to each other such that the uppermost enclosure section is fixed with respect to the water reservoir housing and the lowermost enclosure section contacts the water in the water reservoir.

2. The portable humidifier of claim 1, further comprising low water means for sensing when the level of the water in the vaporizing chamber has become lower than a second predetermined height, and for preventing the vaporizing means from vaporizing water within the vaporizing chamber when the level of water in the vaporizing chamber has become lower than the second predetermined height.

3. The portable humidifier of claim 1, further comprising overheat means for sensing when a temperature of the vaporizing means has exceeded a predetermined temperature, and for preventing the vaporizing means from vaporizing water within the vaporizing chamber when the temperature of the vaporizing means has exceeded the predetermined temperature.

4. The portable humidifier of claim 1, further comprising shutoff means for sensing when an electrical fault associated with the humidifier occurs, and for preventing the vaporizing means from vaporizing water within the vaporizing chamber when the electrical fault occurs.

5. The portable humidifier of claim 1, wherein the vaporizing means comprises an electrically-powered heating element that heats the water within the vaporizing chamber to a temperature that is high enough to vaporize the water within the vaporizing chamber, and wherein electric power is supplied to the heating element from an electric power source located apart form the humidifier, the electric power being supplied through an electrical cord connected to the heating element and selectively connected to the electric power source at an electrical plug end of the electrical cord.

6. The portable humidifier of claim 5, further including a ground fault interrupt circuit operable to selectively prevent electric power from the electric power source from being applied to the heating element upon an occurrence of at least one of a plurality of fault conditions.

7. The portable humidifier of claim 6, wherein the ground fault interrupt circuit is located at the electrical plug end of the electrical cord.

8. A portable humidifier for vaporizing water held in a water reservoir apart from the humidifier, the humidifier comprising:

a. a vaporizing chamber having at least one inlet for passing water therethrough and into the vaporizing chamber, and having at least one outlet for passing water vapor therethrough and out of the vaporizing chamber and into a surrounding environment, the vaporizing chamber having floating means associated therewith for floating the vaporizing chamber in the water reservoir;

b. vaporizing means, disposed in the vaporizing chamber, for vaporizing water within the vaporizing chamber to create the water vapor that passes through the outlet into the surrounding environment;

c. ground fault interrupt circuit means for sensing an occurrence of at least one of a plurality of fault conditions associated with the humidifier, and for preventing the vaporizing means from vaporizing water within the vaporizing chamber upon the occurrence of at least one of the fault conditions, wherein electric power is supplied to the vaporizing means from an electric power source located apart from the humidifier, the electric power being supplied through an electrical cord connected to the vaporizing means and also adapted to be selectively connected to the electric power source at an electrical plug end of the electrical cord, the ground fault interrupt circuit means being located at the electrical plug end of the electrical cord; and d. a telescoping outer enclosure comprising a plurality of enclosure sections connected together, a lowermost enclosure section enclosing the vaporizing chamber and the vaporizing means, an uppermost enclosure section connected with a housing of the water reservoir, as the level of water in the water reservoir decreases over time as the water is vaporized, the enclosure sections slide with respect to each other such that the uppermost enclosure section is fixed with respect to the water reservoir housing and the lowermost enclosure section contacts the water in the water reservoir.

9. The portable humidifier of claim 8, further comprising high water means for sensing when a level of the water in the vaporizing chamber has exceeded a first predetermined height, and for preventing the vaporizing means from vaporizing water within the vaporizing chamber when the level of water in the vaporizing chamber has exceeded the first predetermined height, wherein the level of water in the vaporizing chamber exceeding the first predetermined height comprising one of the at least one fault conditions.

10. The portable humidifier of claim 8, further comprising low water means for sensing when the level of the water in the vaporizing chamber has become lower than a second predetermined height, and for preventing the vaporizing means from vaporizing water within the vaporizing chamber when the level of water in the vaporizing chamber has become lower than the second predetermined height, wherein the level of water in the vaporizing chamber being lower than the second predetermined height comprising one of the at least one fault conditions.

11. The portable humidifier of claim 8, further comprising overheat means for sensing when a temperature of the vaporizing means has exceeded a predetermined temperature, and for preventing the vaporizing means from vaporizing water within the vaporizing chamber when the temperature of the vaporizing means has exceeded the predetermined temperature, wherein the temperature of the vaporizing means exceeding the predetermined temperature comprising one of the at least one fault conditions.

12. The portable humidifier of claim 8, further comprising shutoff means for sensing when an electrical fault associated with the humidifier occurs, and for preventing the vaporizing means from vaporizing water within the vaporizing chamber when the electrical fault occurs, wherein the occurrence of the electrical fault comprising one of the at least one fault conditions.

13. A portable humidifier for vaporizing water held in a water reservoir apart from the humidifier, the humidifier comprising:

a. a vaporizing chamber having at least one inlet for passing water therethrough and into the vaporizing chamber, and having at least one outlet for passing water vapor therethrough and out of the vaporizing chamber and into a surrounding environment, the vaporizing chamber having floating means associated therewith for floating the vaporizing chamber in the water reservoir;

b. vaporizing means, disposed in the vaporizing chamber, for vaporizing water within the vaporizing chamber to create the water vapor that passes through the outlet into the surrounding environment; and c. a telescoping outer enclosure comprising a plurality of enclosure sections connected together, a lowermost enclosure section enclosing the vaporizing chamber and the vaporizing means, an uppermost enclosure section connected with a housing of the water reservoir, as the level of water in the water reservoir decreases over time as the water is vaporized, the enclosure sections slide with respect to each other such that the uppermost enclosure section is fixed with respect to the water reservoir housing and the lowermost enclosure section contacts the water in the water reservoir.

14. The portable humidifier of claim 13, wherein the floating means comprises at least one air-filled chamber within the lowermost enclosure section.

15. The portable humidifier of claim 13, further comprising ground fault interrupt circuit means for sensing an occurence of at least one of a plurality of fault conditions associated with the humidifier, and for preventing the vaporizing means from vaporizing water within the vaporizing chamber upon the occurrence of at least one of the fault conditions, wherein electric power is supplied to the vaporizing means from an electric power source located apart from the humidifier, the electric power being supplied through an electrical cord connected to the vaporizing means and also adapted to be selectively connected to the electric power source at an electrical plug end of the electrical cord, the ground fault interrupt circuit means being located at the electrical plug end of the electrical cord.

16. The portable humidifier of claim 13, wherein the vaporizing means comprises an electrically-powered heating element that heats the water within the vaporizing chamber to a temperature that is high enough to vaporize the water within the vaporizing chamber, and wherein electric power is supplied to the heating element from an electric power source located apart form the humidifier, the electric power being supplied through and electrical cord connected to the heating element and also adapted to be selectively connected to the electric power source at an electrical plug end of the electrical cord.

17. The portable humidifier of claim 16, further including a ground fault interrupt circuit operable to selectively prevent electric power from the electric from the electric power source from being applied to the heating element upon an occurrence of at least one of a plurality of fault conditions.

18. The portable humidifier of claim 17, wherein the ground fault interrupt circuit is located at the electrical plug end of the electrical cord.

* * * * *

UNITED STATES PATENT AND TRADEMARK OFFICE
CERTIFICATE OF CORRECTION

PATENT NO. : 5,673,360
DATED : September 30, 1997
INVENTOR(S) : J. SEBASTIAN SCRIPPS It is certified that error appears in the above-identified patent and that said Letters Patent is hereby corrected as shown below:

Column 7, line 31, change "providing for proper" to
--other means utilized--

Column 10, line 54, change "and electrical" to --an electrical--

Signed and Sealed this

Twenty-fourth Day of February, 1998

Attest:

BRUCE LEHMAN

Attesting Officer

Commissioner of Patents and Trademarks